(12) United States Patent
Lee

(10) Patent No.: US 6,454,678 B1
(45) Date of Patent: Sep. 24, 2002

(54) SHIFT CONTROL METHOD FOR AUTOMATIC TRANSMISSION

(75) Inventor: Sang-Chul Lee, Seoul (KR)

(73) Assignees: Hyundai Motor Company, Seoul (KR); Kia Motors Corp., Kyungki-do (KR)

(*) Notice: Subject to any disclaimer, the term of this patent is extended or adjusted under 35 U.S.C. 154(b) by 71 days.

(21) Appl. No.: 09/655,848

(22) Filed: Sep. 6, 2000

(30) Foreign Application Priority Data

Dec. 30, 1999 (KR) .......................................... 99-66412

(51) Int. Cl.⁷ ............................................. F16H 61/04
(52) U.S. Cl. ........................ 477/141; 477/139; 477/140
(58) Field of Search ................................. 477/138, 139, 477/140, 141, 154; 701/64, 66; 74/336 R

(56) References Cited

U.S. PATENT DOCUMENTS

| 5,913,748 | A | * | 6/1999 | Takiguchi | .................... | 477/148 |
| 6,064,935 | A | * | 5/2000 | You | .............................. | 701/55 |
| 6,073,071 | A | * | 6/2000 | Yasue et al. | .................. | 701/51 |
| 6,216,073 | B1 | * | 10/2001 | Horiguchi | .................... | 701/51 |

* cited by examiner

Primary Examiner—Sherry Estremsky
Assistant Examiner—Eric M. Williams
(74) Attorney, Agent, or Firm—Birch, Stewart, Kolasch & Birch, LLP

(57) ABSTRACT

A shift control method for an automatic transmission includes the steps of outputting a predetermined shift control signal while driving in a second speed for controlling shifting into a third speed if signals indicating that shifting from the second speed into the third speed are applied; determining if third speed synchronization is completed; or determining if a tip-in signal has been applied if third speed synchronization is not completed; outputting a throttle compensation duty and determining if signals corresponding to 3-2 kickdown shifting are received if a tip-in signal is applied during third speed synchronization; comparing an oil temperature with a first predetermined value if signals corresponding to 3-2 kickdown shifting are received; comparing a vehicle speed with a second predetermined value if the oil temperature is greater than or equal to the first predetermined value; detecting an On/Off state of a kickdown switch if the vehicle speed is greater than or equal to the second predetermined value; performing 3-2 kickdown shift control during shifting from the second speed to the third speed if the difference of turbine rpm and engine rpm is greater than or equal to the third predetermined value.

51 Claims, 11 Drawing Sheets

SHIFT CONTROL METHOD FOR AUTOMATIC TRANSMISSION

BACKGROUND OF THE INVENTION (a) Field of the Invention

The present invention relates to an automatic transmission for vehicles. More particularly, the present invention relates to a shift control method for an automatic transmission which reduces shift shock occurring when shifting into back into second speed by the driver depressing the accelerator pedal during lift-foot-up shifting into the third speed from the second speed.

(b) Description of the Related Art

In the automatic transmission used for vehicles, a shift control system performs control to realize automatic shifting into different speeds and shift ranges according to various factors including throttle opening, vehicle speed and load, and several engine and driving conditions detected through a plurality of sensors. That is, based on such factors, the shift control system controls a plurality of solenoid valves of a hydraulic control system such that hydraulic flow in the hydraulic control system is controlled, resulting in the shifting of the transmission into the various speeds and shift ranges.

In more detail, when the driver manipulates a shift lever to a particular shift range, a manual valve of the hydraulic control system undergoes port conversion as a result of the manual valve being indexed with the shift lever. By this operation, hydraulic pressure supplied from a hydraulic pump selectively engages a plurality of friction elements of a gearshift mechanism according to the duty control of the solenoid valves, thereby realizing shifting into the desired shift range.

In such an automatic transmission, shift quality is determined by how smoothly the friction elements are engaged and disengaged. Namely, when changing shift ranges, the timing between the engagement of a specific set of friction elements in relation to the disengagement of another specific set of friction elements determines the shift quality of the automatic transmission. Accordingly, there have been ongoing efforts to develop improved shift control methods that enhance shift quality by better controlling the timing of friction elements to engaged and disengaged states.

The different kinds of automatic shifting operations that are performed according to driving state include sequential upshifting from the first speed to the fourth speed and sequential downshifting from the fourth speed to the first speed, skip downshifting or forced downshifting from the fourth to the second speed and from the third to the first speed, and lift-foot-up (LFU) shifting from the second speed to the third speed. The present invention relates to a method of controlling shifting back into the second speed during LFU shifting into the third speed from the second speed.

In the prior art method, when the driver depresses the accelerator pedal during LFU shifting from the second speed to the third speed, after shifting into the third speed is completed, this speed is first held for a predetermined duration before performing shifting back into the second speed. However, shift shock results from this process.

SUMMARY OF THE INVENTION

The present invention has been made in an effort to solve the above problems.

It is an object of the present invention to provide a shift control method for an automatic transmission in which when the accelerator pedal is depressed by the driver during LFU shifting into a third speed from a second speed, shifting is immediately performed back into the second speed after the completion of shifting into the third speed such that shift shock is minimized.

To achieve the above object, the present invention provides a shift control method for an automatic transmission comprising the steps of outputting a predetermined shift control signal while driving in a second speed for controlling shifting into a third speed if signals indicating that shifting from the second speed into the third speed are applied; determining if third speed synchronization is completed; performing driving in the third speed if third speed synchronization is completed, or determining if a tip-in signal has been applied if third speed synchronization is not completed; outputting a throttle compensation duty and determining if signals corresponding to 3-2 kickdown shifting are received if a tip-in signal is applied during third speed synchronization; comparing an oil temperature with a first predetermined value if signals corresponding to 3-2 kickdown shifting are received; comparing a vehicle speed with a second predetermined value if the oil temperature is greater than or equal to the first predetermined value; detecting an On/Off state of a kickdown switch if the vehicle speed is greater than or equal to the second predetermined value; determining if a difference of turbind rpm and engine rpm and engine rpm is greater than or equal to a third predetermined value if the kickdown switch is On; performing 3-2 kickdown shift control during shifting from the second speed to the third speed if the difference of turbine rpm and engine rpm is greater than or equal to the third predetermined value; and performing 3-2 kickdown shift control after third speed synchronization if the difference of turbine rpm and engine rpm is smaller than the third predetermined value.

According to a feature of the present invention, the first predetermined value is 20° C. and the second predetermined value is 1500 rpm.

According to another feature of the present invention, if the oil temperature is less than the first predetermined value, 3-2 kickdown shifting is performed after synchronization into the third speed is completed.

According to yet another feature of the present invention, the method further comprises the steps of determining that the kickdown switch is On if the vehicle speed is less than the second predetermined value; and performing 3-2 kickdown shift control after third speed synchronization is completed if the kickdown switch is On.

According to still yet another feature of the present invention, if it is determined that the kickdown switch is Off, 3-2 kickdown shift control during shifting from the second speed to the third speed includes the steps of outputting an SCSV-B On signal; outputting general control signals after a duty is compensated, and if an initial fill time is elapsed outputting predetermined duty control signals to perform run-up and tie-up control; and performing initial duty learn control if 3-2 kickdown shift duty control is completed.

According to still yet another feature of the present invention, the duty compensation is realized by adding a predetermined compensation duty to a final duty value of a throttle compensation duty.

According to still yet another feature of the present invention, the general control signals are output if a predetermined time has elapsed after the compensation duty is output.

According to still yet another feature of the present invention, the initial fill time is 300 ms.

According to still yet another feature of the present invention, the step of outputting the predetermined duty control signals includes the steps of performing open-loop duty control, that is, after compensating a duty Da3 by a predetermined first compensation duty following the holding of the duty for a predetermined hold time ta2, increasing a resulting duty by a rate of α%/sec, and after compensating the duty by a second predetermined compensation duty, performing open-loop duty control; maintaining an output duty for a predetermined hold time te and determining if shift synchronization is completed following the completion of general control if open-loop duty control is completed; and completing duty control is shift synchronization is completed.

According to still yet another feature of the present invention, the hold time ta2 is 500 ms.

According to still yet another feature of the present invention, if the hold time ta2 is not elapsed, it is determined if the condition of Nt−(No×second gear ratio)>10 rpm; and if this condition is satisfied, increasing the duty by a rate of α%/sec after compensating the duty by the predetermined second compensation duty.

According to still yet another feature of the present invention, if the condition of Nt−(No×second gear ratio)>10 rpm is not satisfied, a present duty value is compensated by a predetermined compensation value, and open-loop duty control is performed.

According to still yet another feature of the present invention, the duty output completion conditions include the satisfaction of (No×second gear ratio)−Nt≦an eighth predetermined value for two or more cycles, or [(No×second gear ratio−Nt)/dNt]≦a ninth predetermined value for two or more cycles.

According to still yet another feature of the present invention, the eighth predetermined value is a predetermined map value of a pre-installed program and the ninth predetermined value is 50 ms.

According to still yet another feature of the present invention, if the duty completion conditions are not satisfied, it is determined if tc has exceeded a tenth predetermined value; and if tc has exceeded the tenth predetermined value, duty is compensated by a map value in a pre-installed program, regardless of whether duty completion conditions are satisfied, then open-loop duty control is performed.

According to still yet another feature of the present invention, the tenth predetermined value is 300 ms.

According to still yet another feature of the present invention, if tc has not exceed the tenth predetermined value, duty is increased by a rate of α%/sec.

According to still yet another feature of the present invention, 3-2 kickdown shift duty control completion is realized if it is determined that shift synchronization has occurred.

According to still yet another feature of the present invention, shift synchronization is determined if turbine rpm have reached a target turbine rpm.

According to still yet another feature of the present invention, the method further comprises the steps of determining if te has exceeded an eleventh predetermined time if shift synchronization has not occurred; completing shifting if te has exceeded the eleventh predetermined time, regardless of whether synchronization has occurred; and maintaining duty for te and continuously checking the completion of shift synchronization if te has not exceeded the eleventh predetermined time.

According to still yet another feature of the present invention, te is 300 ms and the third predetermined value is a map value established in a pre-installed program.

According to still yet another feature of the present invention, if it is determined that the kickdown switch if Off, a duty of 0% is output and duty control is completed.

According to still yet another feature of the present invention, the step of performing 3-2 kickdown shift control during shifting from the second speed to the third speed if the sum of turbine rpm and engine rpm is greater than or equal to the third predetermined value comprises the steps of determining turbine rpm after outputting a SCSV-B On signal and compensating duty by using a final duty value as an initial value and outputting the same; setting a duty hold time ta as a twelfth predetermined value if turbine rpm are high, setting the duty hold time ta as a thirteenth predetermined value if turbine rpm are at a medium level, and setting the duty hold time ta as a fourteenth predetermined value if turbine rpm are low; outputting general control signals if tk1 has elapsed, and determining if turbine rpm have reached target turbine rpm; setting and outputting an output duty as a map value established in a pre-installed program if turbine rpm have reached the target turbine rpm, and determining a state of the kickdown switch and performing run-up prevention control and tie-up prevention control; compensating the present output duty by Δd3 if the kickdown switch is Off, then increasing duty by a rate of α%/sec; determining if duty output completion conditions are satisfied; compensating the duty by a compensation value established by the pre-installed program if the duty output completion conditions are satisfied, then performing feedback duty control; determining if feedback duty control completion conditions are satisfied; completing feedback duty control and completing general control if the feedback duty control completion conditions are satisfied, then maintaining output duty for a hold time te and determining if shift synchronization is completed; and completing duty control and performing initial duty learn control if shift synchronization is completed.

According to still yet another feature of the present invention, the twelfth predetermined value is 10 ms, the thirteenth predetermined value is 50 ms, and the fourteenth predetermined value is 100 ms.

According to still yet another feature of the present invention, if turbine rpm have not reached the target turbine rpm, it is determined if ta2>ta1+10 ms; the output duty is set as the map value even if turbine rpm have not reached the target turbine rpm if ta2>ta1+10 ms is satisfied; and it is determined if turbine rpm have reached the target turbine rpm if ta2>ta1+10 ms is not satisfied.

According to still yet another feature of the present invention, if it is determined that the kickdown switch is On, it is determined if Nt−(No×second gear ratio)>10 rpm is satisfied; and if this condition is met, the present output duty is compensated by a predetermined value and a resulting duty is output.

According to still yet another feature of the present invention, if the condition of Nt−(No×second gear ratio)>10 rpm is not satisfied, the duty is compensated by a predetermined value then feedback duty control is performed.

According to still yet another feature of the present invention, the duty output completion conditions are (No× second speed ratio)−Nt≦a fifteenth predetermined value for two or more cycles, and (No×second speed gear ratio − Nt)/dNt≦a sixteenth predetermined value for two or more cycles.

According to still yet another feature of the present invention, the fifteenth predetermined value is a map value established by the pre-installed program and the sixteenth predetermined value is 50 ms.

According to still yet another feature of the present invention, if the duty output completion conditions are not satisfied, it is determined if tc has exceeded a seventeenth predetermined value; if tc has exceeded the seventeenth predetermined value, duty is compensated by a map value established in the pre-installed program and a resulting duty output; and open-loop duty control is performed.

According to still yet another feature of the present invention, the seventeenth predetermined value is 300 ms and if tc has not exceeded the seventeenth predetermined value, duty is increased by a rate of $\alpha$%/sec.

According to still yet another feature of the present invention, the feedback duty control completion conditions include Nt−No×second gear ratio$\leq \pm$XG for five or more cycles, or feedback control time $(t_{Fb}) \geq$ an eighteenth predetermined value.

According to still yet another feature of the present invention, XG is a map value established by the pre-installed program and the eighteenth predetermined value is 300 ms.

According to still yet another feature of the present invention, it is determined that shift synchronization is completed when turbine rpm have reached target turbine rpm.

According to still yet another feature of the present invention, if shift synchronization is not completed, it is determined if te has exceeded a nineteenth predetermined value; shifting is completed regardless of whether shift synchronization has taken place if te has surpassed the nineteenth predetermined value; and duty is maintained for te and shift synchronization completion is continuously detected if te has not surpassed the nineteenth predetermined value.

According to still yet another feature of the present invention, the nineteenth predetermined value is 300 ms.

According to still yet another feature of the present invention, run-up prevention control comprises the steps of determining if a run-up prevention start condition is satisfied; compensating a present duty by a map value and outputting a resulting duty if the run-up prevention start condition is satisfied, and determining if run-up prevention discontinue conditions are satisfied; and outputting a duty as a map value established in the pre-installed program if the run-up prevention discontinue conditions are satisfied.

According to still yet another feature of the present invention, the run-up prevention start condition includes determining if a change in turbine rpm is greater than or equal to a predetermined twentieth value.

According to still yet another feature of the present invention, the predetermined twentieth value is 40 rpm.

According to still yet another feature of the present invention, the run-up prevention discontinue conditions include determining if Nt−No×second gear ratio>a predetermined standard value, change in turbine rpm<0, and Nt>No are satisfied, or if the single condition of the change in turbine rpm<a predetermined standard value.

According to still yet another feature of the present invention, tie-up prevention control comprises the steps of determining if a tie-up prevention start condition is satisfied; compensating a present duty by a map value and outputting a resulting duty if the tie-up prevention start condition is satisfied, and determining if tie-up prevention discontinue conditions are satisfied; and outputting a duty as a map value established in the pre-installed program if the tie-up prevention discontinue conditions are satisfied.

According to still yet another feature of the present invention, the tie-up prevention start condition includes determining if No×second gear ratio−Nt>a predetermined twenty-first value.

According to still yet another feature of the present invention, the predetermined twenty-first value is 20 rpm.

According to still yet another feature of the present invention, the tie-up prevention discontinue conditions include determining if No×second gear ratio−Nt>a predetermined standard value, and a change in turbine rpm dNt<predetermined value, or if the single condition of No×second gear ratio−Nt$\leq$a predetermined standard value.

According to still yet another feature of the present invention, the initial duty learn control is performed by learning a value derived by adding a duty compensation amount learned previously to a map value established by the pre-installed program.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
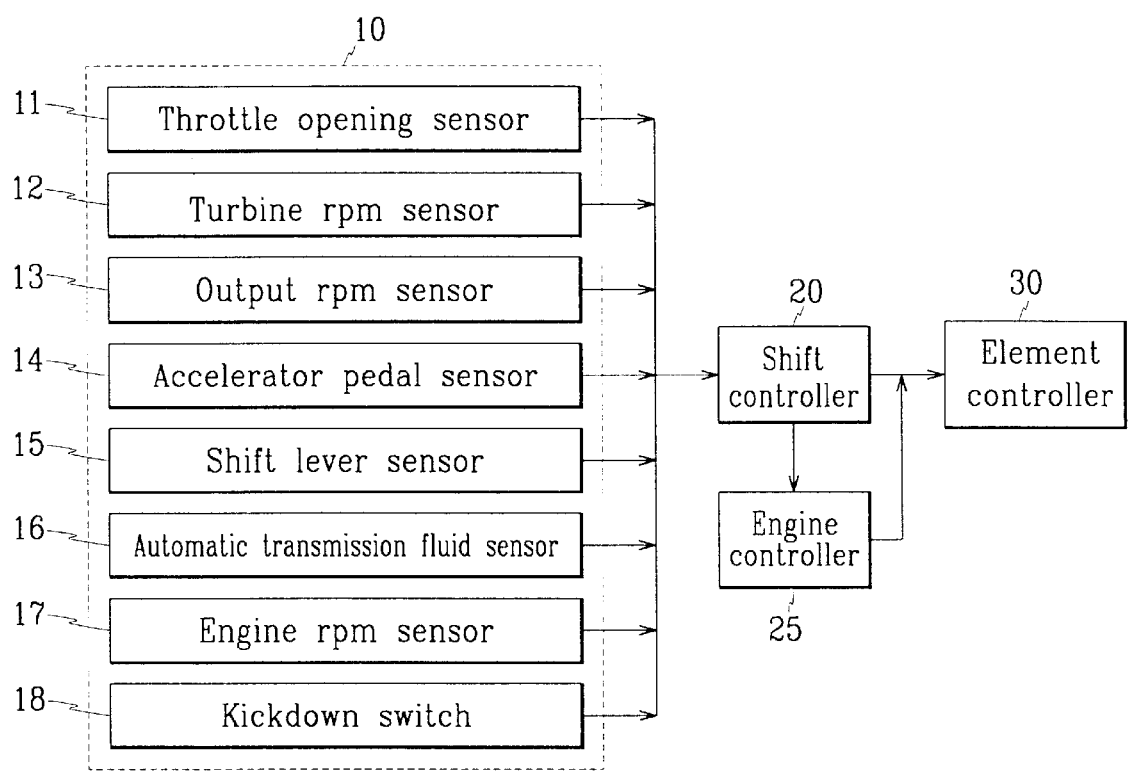
FIG. 1 is a block diagram of a shift control system and related elements to which the present invention is applied.

Preferred embodiments of the present invention will now be described in detail with reference to the accompanying drawings.

The shift controller 20 receives the signals output by the drive state detector 10 and performs control such that shifting into the appropriate range occurs. That is, if the shift controller 20 receives signals such that shifting into a third speed from a second speed is required, the shift controller 20 outputs specific shift control signals, then determines if third speed synchronization is completed, after which the vehicle is driven in the third speed. However, if it is determined that third speed synchronization is not achieved, the shift controller 20 determines if a tip-in signal has been applied. If a tip-in signal is applied during third speed synchronization, the shift controller 20 outputs a throttle compensation duty and determines if signals corresponding to 3-2 kickdown shifting are received. If signals corresponding to 3-2 kickdown shifting are received, the oil temperature is compared with a first predetermined value, and if the oil temperature is greater than or equal to the first predetermined value, the vehicle speed is compared with a second predetermined value. However, if the oil temperature is less than the first predetermined value, 3-2 kickdown shifting is effected by the shift controller 20 after synchronization into the third speed is achieved. In the case where the vehicle speed is greater than or equal to the second predetermined value, an On/Off state of the kickdown switch 18 is detected. If the kickdown switch 18 is On, it is determined by the shift controller 20 if the difference of turbine rpm and engine rpm is greater than or equal to a third predetermined value, and if the kickdown switch 18 is Off, a predetermined duty control signal is output by the shift controller 20 and duty control is completed. If the sum of turbine rpm and engine rpm is greater than or equal to the third predetermined value, a first sub-routine is performed, and if smaller, 3-2 kickdown shift control is performed after completion of third speed synchronization. The shift controller 20 also outputs an engine torque reduction request signal and an engine torque reduction release request signal.

The shift control system includes a drive state detector 10, a shift controller 20, an engine controller 25, and an element controller 30. The drive state detector 10 detects overall driving conditions of the vehicle. The drive state detector 10 includes a throttle opening sensor 11, a turbine rpm sensor 12, an output rpm sensor 13, an accelerator pedal sensor 14, a shift lever sensor 15, an automatic transmission fluid temperature sensor 16, an engine rpm sensor 17 and a kickdown switch 18. The elements of the drive state detector 10 output signals to the shift controller 20.

The shift controller 20 receives the signals output by the drive state detector 10 and performs control such that shifting into the appropriate range occurs. That is, if the shift controller 20 receives signals such that shifting into a third speed from a second speed is required, the shift controller 20 outputs specific shift control signals, then determines if third speed synchronization is completed, after which the vehicle is driven in the third speed. However, if it is determined that third speed synchronization is not achieved, the shift controller 20 determines if a tip-up signal has been applied. If a tip-up signal is applied during third speed synchronization, the shift controller 20 outputs a throttle compensation duty and determines if signals corresponding to 3-2 kickdown shifting are received. If signals corresponding to 3-2 kickdown shifting are received, the oil temperature is compared with a first predetermined value, and if the oil temperature is greater than or equal to the first predetermined value, the vehicle speed is compared with a second predetermined value. However, if the oil temperature is less than the first predetermined value, 3-2 kickdown shifting is effected by the shift controller 20 after synchronization into the third speed is achieved. In the case where the vehicle speed is greater than or equal to the second predetermined value, an On/Off state of the kickdown switch 18 is detected. If the kickdown switch 18 is On, it is determined by the shift controller 20 if a sum of turbine rpm and engine rpm is greater than or equal to a third predetermined value, and if the kickdown switch 18 is Off, a predetermined duty control signal is output by the shift controller 20 and duty control is completed. If the sum of turbine rpm and engine rpm is greater than or equal to the third predetermined value, a first sub-routine is performed, and if smaller, 3-2 kickdown shift control is performed after completion of third speed synchronization. The shift controller 20 also outputs an engine torque reduction request signal and an engine torque reduction release request signal.

The engine controller 25, according to the engine torque reduction request signal and the engine torque reduction release request signal output by the shift controller 20, outputs engine control signals to reduce engine output and to operate the engine in a normal state. The element controller 30 is duty controlled and On/Off controlled by the shift control signals output by the shift controller 20 such that shifting into the target shift range is performed. Also, the element controller 30 controls fuel injection and ignition timing according to the engine control signals output by the engine controller 25. The element controller 30 includes first and second pressure control solenoid valves PCSV-A and PCSV-B, which are duty controlled, and first, second and third shift control solenoid valves SCSV-A, SCSV-B and SCSV-C, which are On/Off controlled. Fuel injection and ignition timing are controlled by signals output to a fuel injector and an ignition system by the element controller 30.

Figure 2:
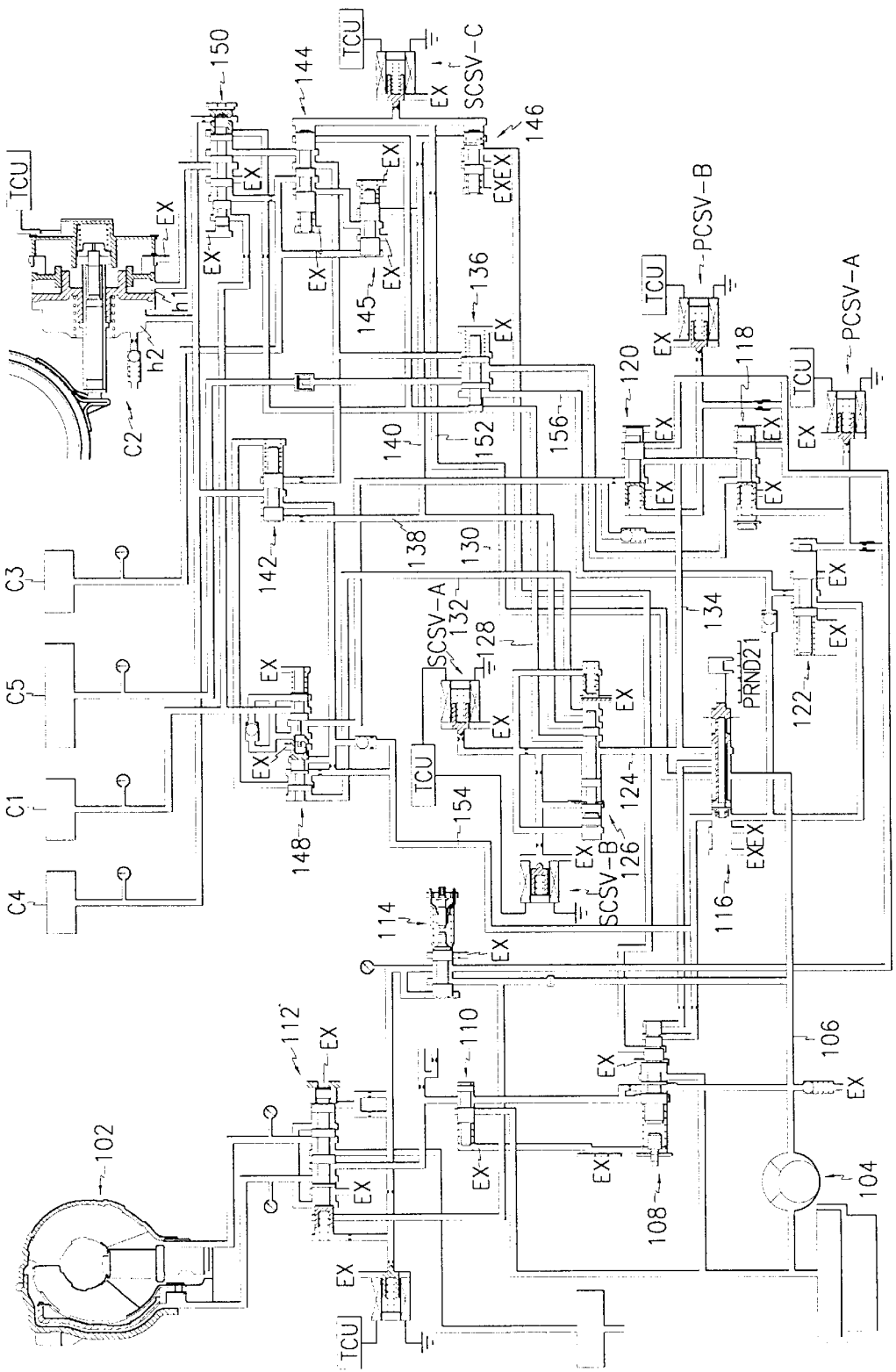
FIG. 2 is a circuit diagram of a hydraulic control system to which the present invention is applied.

FIG. 2 shows a circuit diagram of a hydraulic control system to which the present invention is applied.

The hydraulic control system includes a torque converter 102 which acts as a fluid link between an engine and a transmission, and as a torque multiplier; and a hydraulic pump 104 for generating hydraulic flow to create hydraulic pressure in the hydraulic control system, the hydraulic pressure being used for shift control and for lubrication. The hydraulic flow generated by the operation of the hydraulic pump 104 flows through a line 106 to which are connected a pressure regulator valve 108 for controlling hydraulic pressure flowing therethrough to a predetermined level, a torque converter control valve 110 for controlling hydraulic pressure to a level suitable for the torque converter 102 and for lubrication, and a damper clutch control valve 112 for increasing the power transmission efficiency of the torque converter 102.

Part of the hydraulic pressure generated by the operation of the hydraulic pump 104 is supplied to a reducing valve 114 for reducing hydraulic pressure flowing therethrough to a level lower than line pressure, and to a manual valve 116 which is indexed with a driver-operated shift lever 116 to undergo port conversion. The hydraulic pressure reduced to a predetermined level by the reducing valve 114 is supplied to a first pressure control valve 118 and a second pressure control valve 120 to be used as shift control pressure.

Part of the hydraulic pressure supplied to the first and second pressure control valves 118 and 120 is supplied to an N-R control valve 122, which acts to reduce shift shock when shifting from a neutral N range to a reverse R range. Also, communicated with a line 124 through which hydraulic pressure flows when the manual valve 116 is placed at a drive D position is a shift control valve 126, the shift control valve 126 acting together with the manual valve 116 to realize manual and automatic shifting operations. The shift control valve 126 undergoes port conversion by operation of the first and second shift control solenoid valves SCSV-A and SCSV-B of the element controller 30.

Second, third and fourth speed lines 128, 130 and 132 are connected to the shift control valve 126. Branched from the line 124 is a first speed line 134, the first speed line 134 supplying line pressure to the first and second pressure control valves 118 and 120. The first and second pressure control valves 118 and 120 undergo port conversion by operation respectively of the first and second pressure control solenoid valves PCSV-A and PCSV-B of the element controller 30 such that the first pressure control valve 118 supplies control pressure to friction elements during shift control and the second pressure control valve 120 supplying drive pressure to a rear clutch C1, which operates as an input element in a first speed.

The second speed line 128 connected to the shift control valve 126 supplies hydraulic pressure to leftmost port of a 1-2 shift valve 136 to control the same. The third speed line 130 is branched into two branch lines 138 and 140. The first branch line 138 supplying hydraulic pressure to a leftmost port of a 2-3/4-3 shift valve 142, and the second branch line 140 is again branched to supply hydraulic pressure to an end clutch valve 145 and a high-low pressure valve 146. Also, the fourth speed line 132 is communicated with a leftmost port of a rear clutch release valve 148 and a rightmost port of the 2-3/4-3 shift valve 142 to control the same.

Further, a fail-safe valve 150 provided between at least two friction elements and the valves that supply hydraulic pressure to the friction elements. The fail-safe valve 150 operates to effect shifting into the most suitable shift range in the case of a malfunction of an electronic control unit or the sticking of one of valves.

A timing control line 152 is connected to the manual valve 116, and hydraulic pressure flowing through the timing control line 152 is used-as control pressure of a control switch valve 144. The third shift control solenoid valve SCSV-C of the element controller 30 is mounted on the timing control line 152 and acts to control the control switch valve 144.

When in the reverse R range, the manual valve 116 supplies hydraulic pressure supplied to a reverse first control line 154 to a front clutch C4 via a rear clutch release valve 148 and the 2-3/4-3 shift valve 142, and, at the same time, supplies hydraulic pressure supplied to a reverse second control line 156 to a low-reverse brake C5 via a 1-2 shift valve 135, the low-reverse brake C5 operating as a reaction element in the reverse R range. The manual valve 116 also supplies part of the hydraulic pressure supplied to the front clutch C4 to a release chamber h2 of a kickdown servo C2.

An end clutch valve 160, which is controlled by operational pressure of an end clutch C3, is provided on a second branch line 140 of a third speed line 130, the third speed line 130 supplying third speed pressure to the control switch valve 144. The control switch valve 144 is controlled by the third shift control solenoid valve SCSV-C. The control switch valve 144 acts to supply pressure of the second speed line 128 of the shift control valve 126 to an operational chamber h1 of the kickdown servo C2, and, at the same time, receives control pressure of the first pressure control valve 118 passing through the 1-2 shift valve 136 to supply the control pressure to the operational chamber h1 of the kickdown servo C2 or the end clutch C3.

With the above structure, in the first speed the rear clutch C1 is engaged; in the second speed the rear clutch C1 and the kickdown servo C2 are engaged; in the third speed the rear clutch C1, the end clutch C3 and the front clutch C4 are engaged; and in the fourth speed the kickdown servo C2 and the end clutch C3 are engaged.

Figure 8:
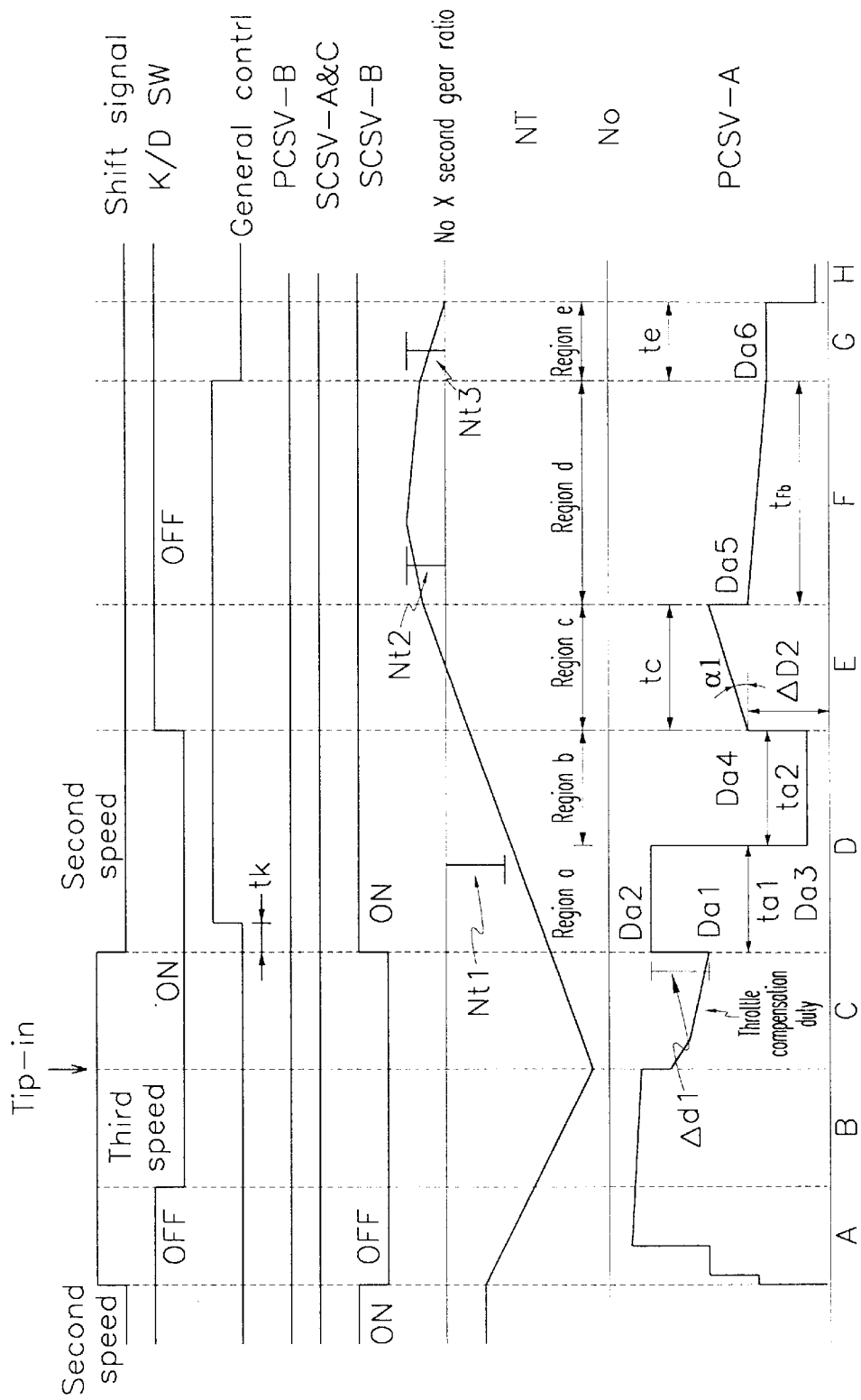
FIGS. 8, 9 and 10 are duty patterns applied to the method of the preferred embodiment of the present invention.

The hydraulic control system as described above is controlled by duty patterns as shown in FIGS. 5 and 8 when downshifting into the second speed from the fourth speed. If a shift signal corresponding to shifting into the second speed from the fourth speed is input, the first shift control solenoid valve SCSV-A is immediately controlled to Off at the start of shifting. In this case, the second shift control solenoid valve SCSV-B is maintained in an Off state for a predetermined period (t1, 20 ms) after the start of shifting, after which it is controlled to On. The third shift control solenoid valve SCSV-C is maintained continuously in an On state.

Figure 3:
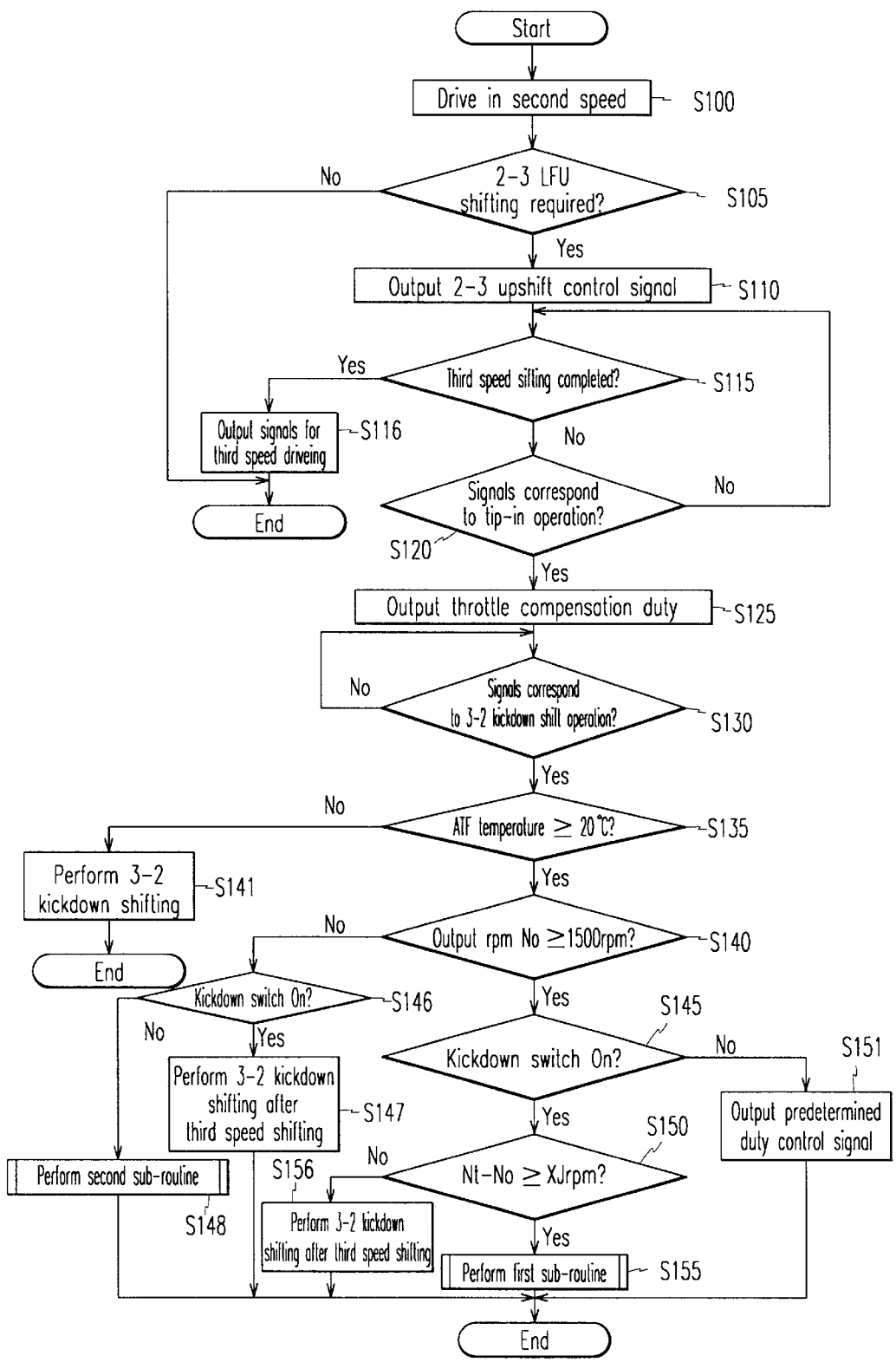
FIG. 3 is a flow chart of a shift control method for an automatic transmission according to a preferred embodiment of the present invention.

FIG. 3 is a flow chart of a shift control method for an automatic transmission according to a preferred embodiment of the present invention.

First, the shift controller 20, which controls the transmission according to a pre-installed program, outputs specific control signals to the drive state detector 10 in step S100. As a result, the drive state detector 10 outputs to the shift controller 20 signals corresponding to detected values including throttle valve opening Th, turbine rpm Nt, output rpm No (i.e., vehicle speed), accelerator pedal position, shift lever position, automatic transmission fluid temperature, engine rpm Ne, and the On/Off state of the kickdown switch 18.

Using the signals received from the drive state detector 10, the shift controller 20 determines if 2-3 LFU shifting is required in step S105. If it is determined that a 2-3 LFU shifting operation needs to performed, the shift controller 20 outputs a 2-3 upshift control signal as shown in FIG. 8 to the element controller 30 in step S110. As a result, the element controller 30 controls the second shift control solenoid valve SCSV-B from On to Off such that hydraulic pressure of a release side of the second friction element C2 is reduced and hydraulic pressure of an engagement side of the second friction element C2 is supplied to slip the second friction element C2, and hydraulic pressure starts to be supplied to the third and fourth friction elements C3 and C4. As a result, shift synchronization into the third speed from the second speed is realized. At this time, if the second friction element C2 starts to slip, the kickdown switch 18 is controlled to an Off state.

Subsequently, the shift controller 20 compares turbine rpm Ne with target rpm and determines if third speed shift synchronization is completed in step S115. The target rpm are calculated by multiplying vehicle speed No by a second speed gear ratio.

If third speed shift synchronization is completed in step S115, the shift controller 20 outputs predetermined signals to effect third-speed driving in step S116. However, if third speed synchronization is not completed in step S115, the shift controller 20 determines if the signals received by the drive state detector 10 correspond to a tip-in operation, in which the driver depresses the accelerator pedal, in step S120.

If the signals received by the drive state detector 10 correspond to a tip-in operation in step S120, the shift controller 20 outputs a throttle compensation duty in step S125, after which the shift controller 20 determines if the signals received by the drive state detector 10 correspond to a 3-2 kickdown shift operation in step S130. However, in step S120, if the signals received by the drive state detector 10 do not correspond to a tip-in operation, the process is returned to step S115.

In step S130, if it is determined that the signals received by the drive state detector 10 correspond to a 3-2 kickdown shift operation, the shift controller 20 determines if the automatic transmission fluid temperature is greater than or equal to a first predetermined value (for example, 20° C.) in step S135. However, if the signals from the drive state detector 10 do not correspond to a 3-2 kickdown shift operation in step S130, the shift controller 20 outputs shift duty control signals and continues to check if the signals output by the drive state detector 10 correspond to a 3-2 kickdown shift operation.

In step S135, if the automatic transmission fluid temperature is greater than or equal to the first predetermined value, the shift controller 20 determines if output rpm No are greater than or equal to a second predetermined value (for example, 1500 rpm) in step S140. However, if in step S135 the automatic transmission fluid temperature is less than the first predetermined value, the shift controller 20 outputs a 3-2 kickdown shift control signal to the element controller 30 after third speed shift synchronization is completed in step S141.

According to the shift control signal received from the shift controller 20, the element controller 30 controls the second shift control solenoid valve SCSV-B from Off to On such that hydraulic pressure is released from the release side of the second friction element C2 and supplied to the engagement side of the second friction element C2, and hydraulic pressure is released from the third and fourth friction elements C3 and C4.

Next, if output rpm No are greater than or equal to the second predetermined value in step S140, the shift controller 20 determines if the kickdown switch 18 is in an On state in step S145. If the kickdown switch 18 is On in step S145, the shift controller 20 determines if Nt−No>XJrpm in step S150, where XJrpm is a map value established by the pre-installed program. If the kickdown switch 18 is Off in step S145, the shift controller outputs a predetermined duty control signal to the element controller 30.

By the control signal output by the shift controller 20, the element controller 30 controls the first pressure control solenoid valve PCSV-A to 0% duty and the second shift control solenoid valve SCSV-B to On, thereby realizing shifting into the second speed. That is, after synchronization in the third speed occurs, shifting is immediately performed back into the second speed.

If step S150 is performed and it is determined that Nt−No≧XJrpm, the shift controller 20 performs a first sub-routine in step S155. However, if Nt−No<XJrpm in step S150, the shift controller 20 performs shifting into the third speed according to the pre-installed program and outputs a 3-2 kickdown shift control signal to the element controller 30 in step S156.

Back in step S140, if output rpm No are less than the second predetermined value, the shift controller 20 determines if the kickdown switch 18 is On in step S146. If the kickdown switch 18 is On, the shift controller 20 performs shifting into the third speed then outputs a 3-2 kickdown shift control signal to the element controller 30 in step S147. In step S146, if the kickdown switch 18 is Off, the shift controller 20 performs a second sub-routine in step S148, thereby completing shift control.

Figure 4A:
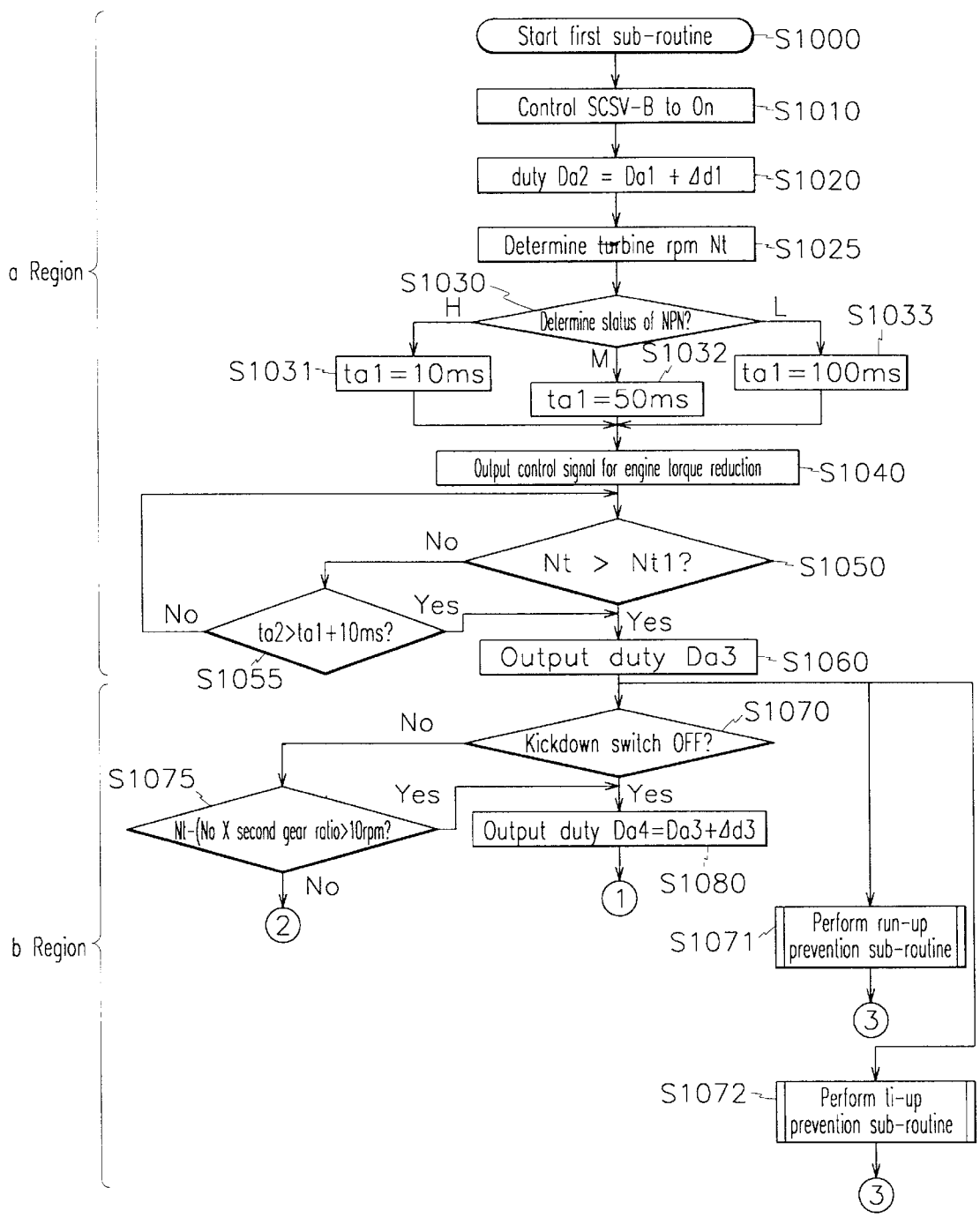
FIGS. 4a and 4b are flow charts of a first sub-routine of the shift control method according to the preferred embodiment of the present invention.
Figure 4B:
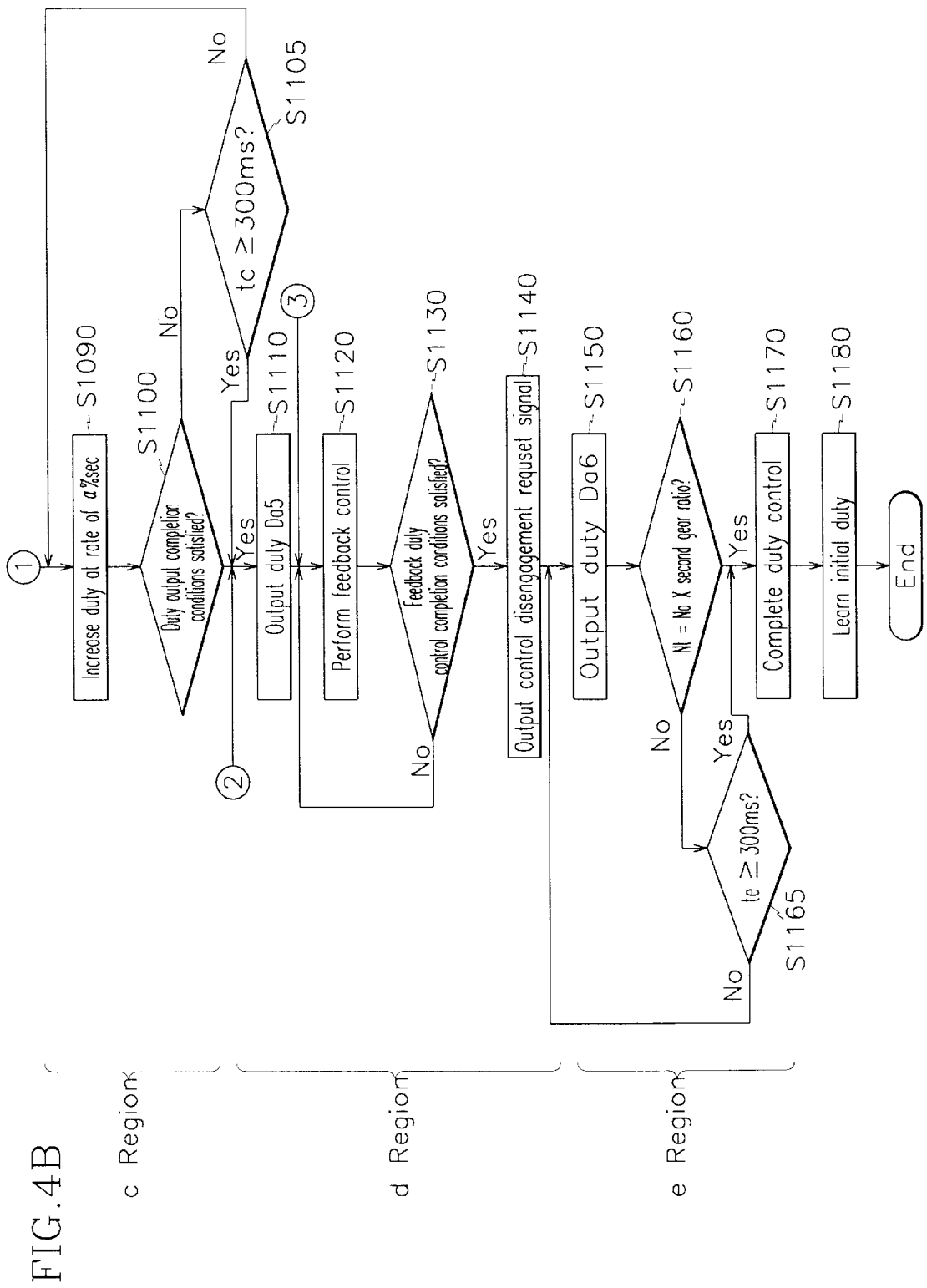

With reference to FIGS. 4a and 4b, if the first sub-routine is started S1000, the shift controller 20 controls the second shift control solenoid valve SCSV-B to On (as shown in FIG. 8) in step S1010. Next, a throttle compensation duty final value Da1 is used as an initial value, and a PSCS-A control duty Da2 is compensated by Δd1, after which a resulting value is output to the element controller 30 in step S1020.

Subsequently, the shift controller 20 determines a position NPN of turbine rpm Nt as a map value stored in the pre-installed program in step S1025, after which it is determined if the position NPN is high, medium, or low in step S1030. Based on the graph of turbine rpm Nt of FIG. 8, if the position NPN is high, the shift controller 20 sets region (a) to which the duty Da2 is held at 10 ms=ta1 in step S1031.

If the position NPN is medium, the shift controller 20 sets region (a) to which the duty Da2 is held at 50 ms=ta1 in step S1032. If the position NPN is low, the shift controller 20 sets region (a) to which the duty Da2 is held at 100 ms ta1 in step S1033.

Next, after the hold time ta1 (one of the three) of the duty Da2 has elapsed, the shift controller 20 outputs a control signal to reduce engine torque to the engine controller 25 in step S1040, then determines if Nt≧Nt1 in step S1050. The engine controller 25, according to the control signal received from the shift controller 20, outputs a predetermined control signal to the element controller 30 such that engine torque is reduced. The element controller 30 controls the fuel injector and the ignition system according to the control signal output by the engine controller 25, thereby controlling the amount of fuel that is injected and ignition timing.

In step S1050, if Nt≧Nt1, the shift controller 20 adds the duty Da2 to an initial duty value learned previously to derive a new duty Da3, and outputs the duty Da3 to the element controller 30 in step S1060. However, if Nt<Nt1 in step S1050, the shift controller 20 determines if the hold time ta1 of the duty Da2 is greater than the hold time ta1 plus 10 ms in step S1055. If the hold time ta1 of the duty Da2 is not greater than the hold time ta1 plus 10 ms, step S1050 of checking if Nt>Nt1 is continuously performed. If the hold time ta1 of the duty Da2 is greater than the hold time ta1 plus 10 ms, on the other hand, an initial duty of region (b) is added to a learned initial duty value, and a resulting duty Da3 is output to the element controller 30 in step S1060.

Subsequently, the shift controller 20 determines if the kickdown switch 18 is Off in step S1070, and, at the same time (in region b), performs a run-up prevention sub-routine in step S1071 and a tie-up prevention sub-routine in step S1072. In step S1070, if the kickdown switch 18 is Off, the shift controller 20 compensates the present duty Da3 by Δd2 such that the duty is increased to a new duty Da4, then outputs the duty Da4 to the element controller 30 (at the end of region b) in step S1080.

Next, the shift controller 20 increases the duty Da4 at a predetermined rate α%/sec and outputs the same to the element controller 30 in step S1090. The shift controller 20 then determines if region C completion conditions are satisfied in step S1100. Region C completion conditions include the satisfaction of (No×second speed ratio)−Nt≦XN for two or more cycles, and (No×second speed gear ratio−Nt)/dNt≦50 ms for two or more cycles. If region C completion conditions are satisfied in step S1100, the shift controller 20 outputs a duty Da5 in step S1110. The shift controller 20 then performs feedback control over region (d) in step S1120, the feedback control being provided in the pre-installed program of the shift controller 20.

However, if region C completion conditions are not satisfied in step S1100, the shift controller 20 determines if a set time tc of region C is greater than an eleventh predetermined value (e.g., 300 ms) in step S1105. If this condition is satisfied, the duty Da5 is output, even if region C completion conditions are not satisfied. That is, step S1110 is performed. However, if the set time tc of region C is not greater than the eleventh predetermined value, it is determined if region C completion conditions are satisfied. That is, step S1100 is performed.

Back in step S1070, if the kickdown switch 18 is On, the shift controller 20 determines if the condition Nt−(No× second gear ratio)>10 rpm is met in step S1075. If this condition is satisfied, a duty Da4, which is the duty Da3+ Δd3, is output by the shift controller 20 in step S1080.

Figure 9:
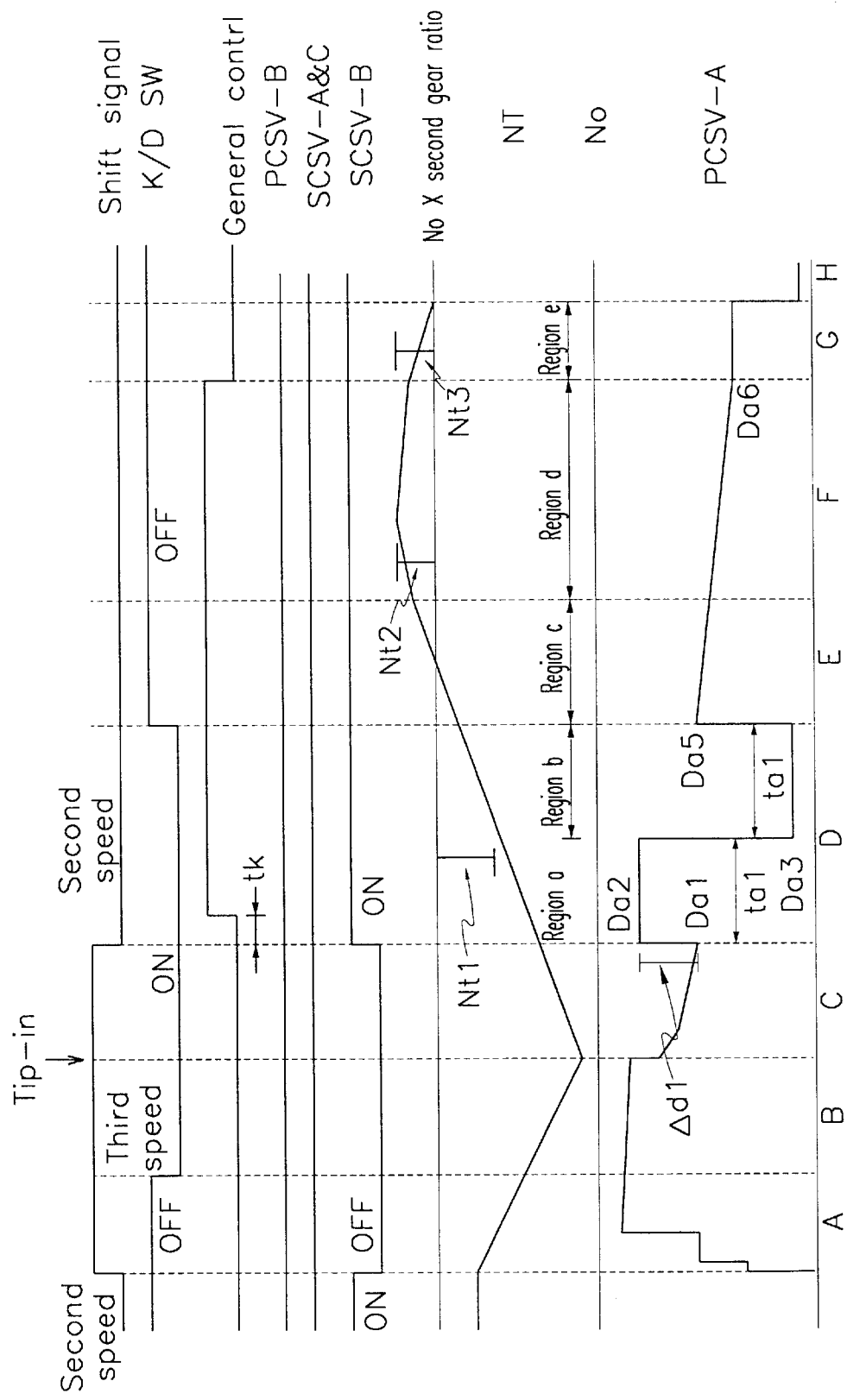
Figure 10:
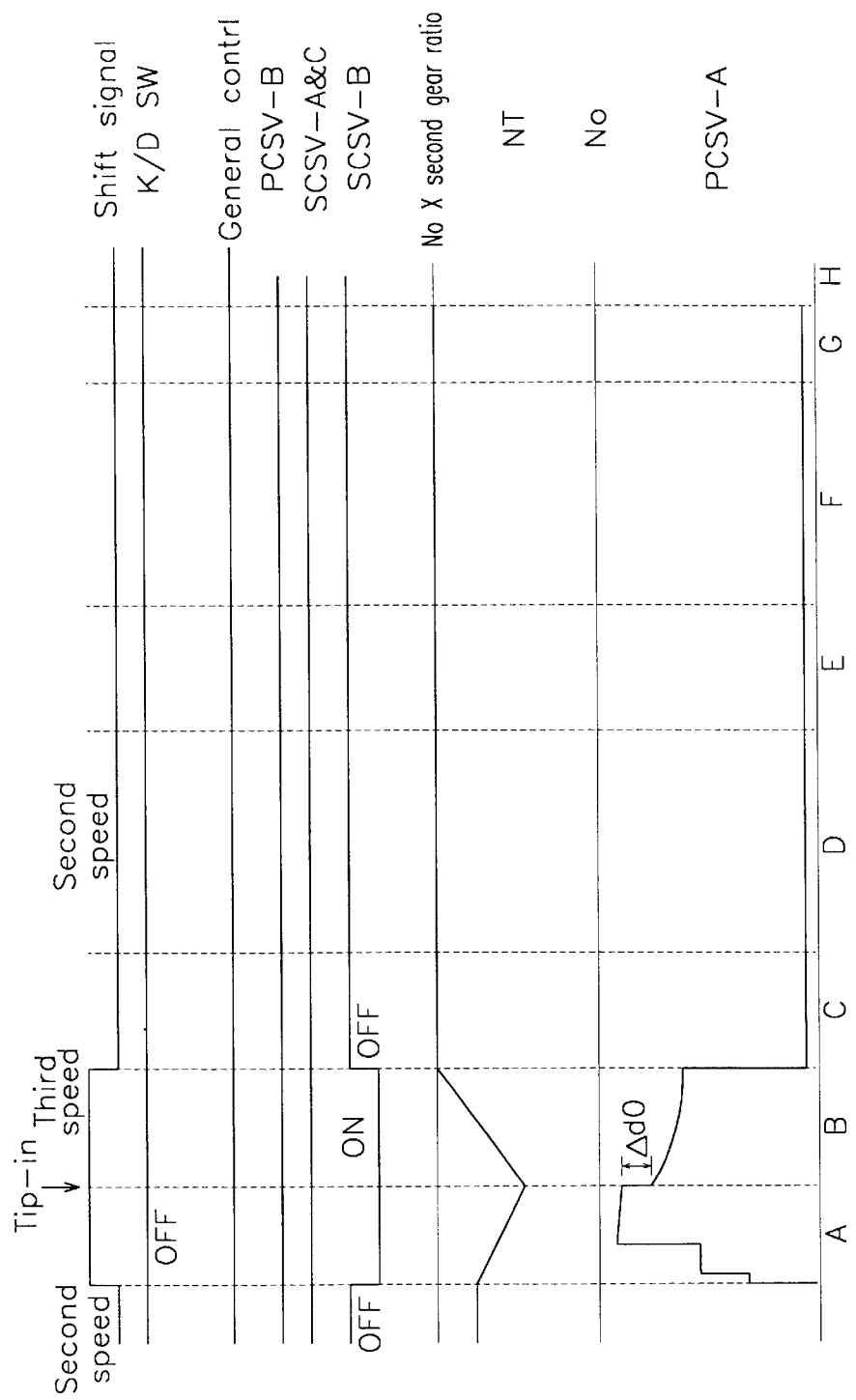

However, if the condition of step S1075 is not satisfied, the duty is set to a duty Da5 as shown in FIG. 9, and output in step S1110. Next, step S1120 of performing feedback duty control is performed.

Following the above, the shift controller 20 determines if feedback duty control completion conditions are satisfied in step S1130. These conditions include the satisfaction of (Nt−No)×second gear ratio≦±XG for five or more cycles (where XG is a predetermined map value in the pre-installed program of the shift controller 20), and the satisfaction of a feedback control set time $(t_{Fb})$≧a twelfth predetermined value (e.g., 300 ms). If the feedback duty control completion conditions are met, the shift controller 20 outputs a control disengagement request signal to the engine controller 25 in step S1140, after which the shift controller 20 outputs a duty Da6 in step S1150. However, if the feedback duty control completion conditions are not satisfied in step S1130, the shift controller 20 continues to perform step S1120.

Following the output of the duty Da6 in step S1150, the shift controller 20 determines if second speed synchronization is completed in step S1160. That is, the shift controller 20 checks if the following condition is met: turbine rpm Nt=No×second speed gear ratio. If it is determined that second speed synchronization is completed, the shift controller 20 controls duty to 0%, then after duty control is finished in step S1170, an initial duty of region b and region C is learned in step S1180. Here, the initial duty is learned by adding a learned duty compensation value to a map value set in the pre-installed program. The learned initial duty of step S1180 is used as a subsequent initial duty compensation value.

However, if second speed synchronization is not completed in step S1160, the shift controller 20 determines if an output time te of the duty Da6 is greater than or equal to a thirteenth predetermined value (e.g., 300 ms) in step S1165, the thirteenth predetermined value being provided by the pre-installed program of the shift controller 20. If the output time te of the duty Da6 is greater than or equal to the thirteenth predetermined value, the shift controller 20 performs step S1170 of controlling duty to 0%. Accordingly, the first sub-routine is completed and the process is returned to the main routine.

Figure 5A:
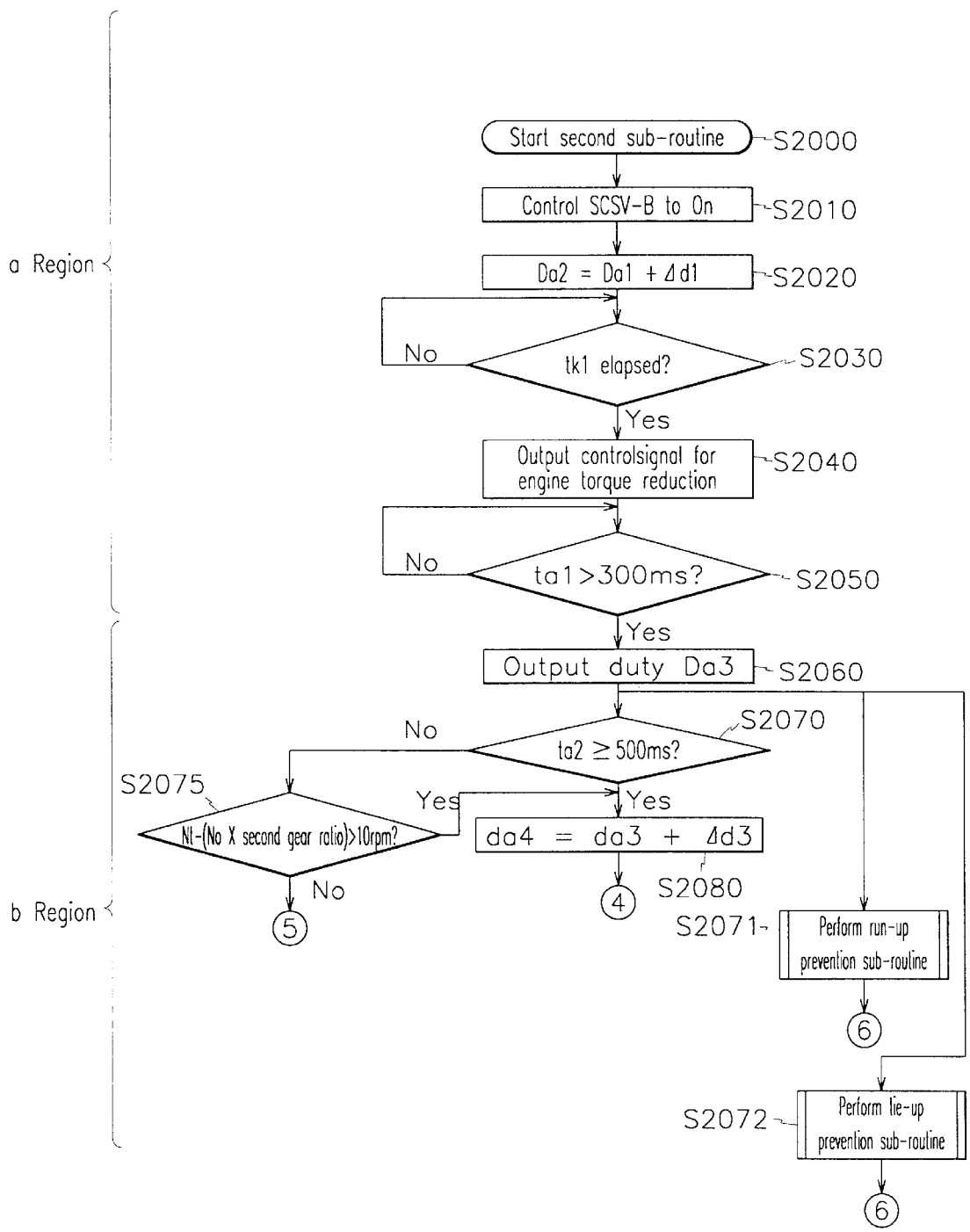
FIGS. 5a and 5b are flow charts of a second sub-routine of the shift control method according to the preferred embodiment of the present invention.
Figure 5B:
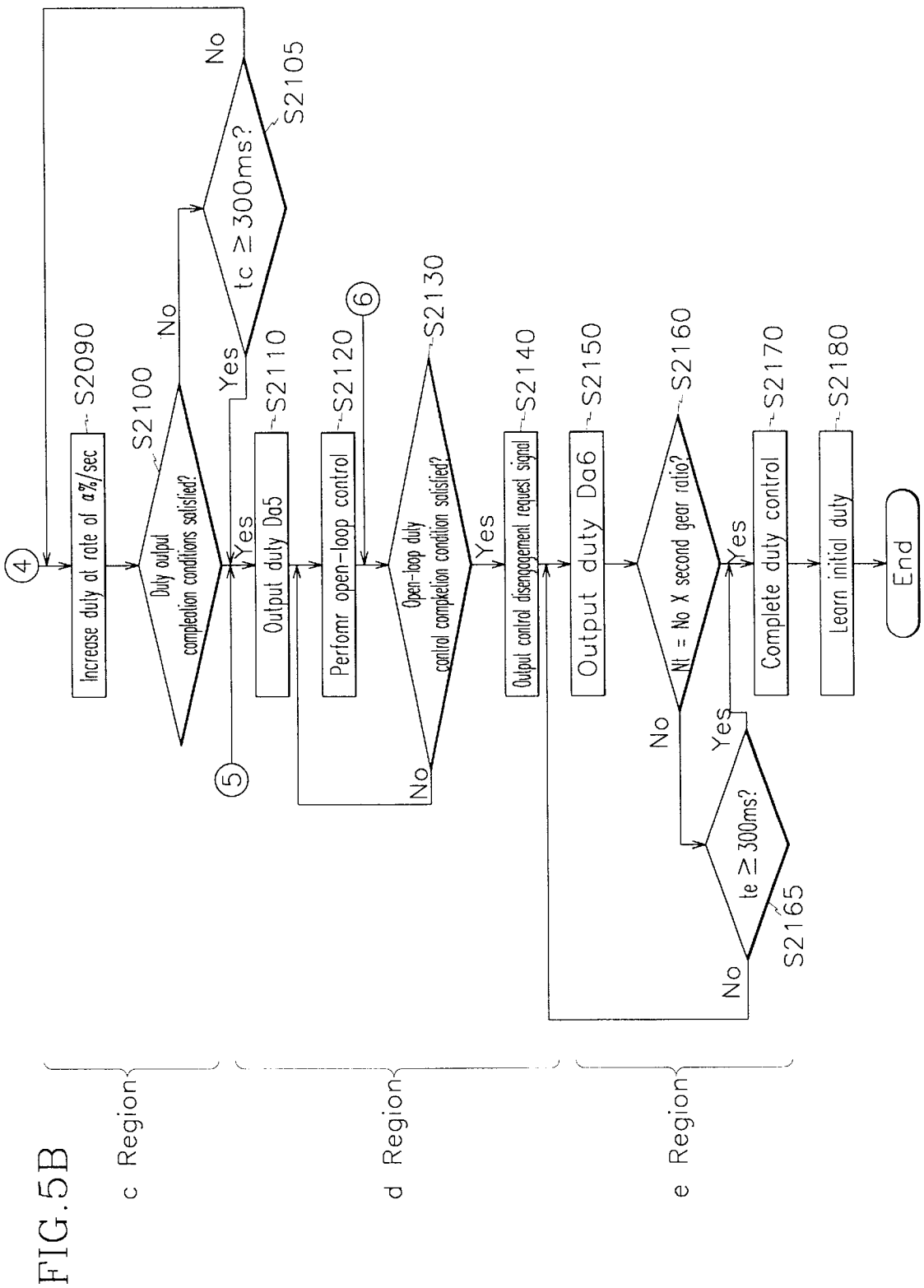

With reference to FIGS. 5a and 5b, if the second sub-routine is started in step S2000, the shift controller 20 controls the second shift control solenoid valve SCSV-B to On in step S2010. Next, the shift controller 20 uses the first pressure control solenoid valve PSCV-A control duty Da1, which is the final value of the throttle compensation duty, as an initial value, and increases the duty Da2 by the predetermined compensation value Δd1, after which the resulting value is output to the element controller 30 in step S2020.

Next, the shift controller 30 determines if a predetermined time tk1 has elapsed in step S2030. This step is performed after the completion of the increase of the duty Da2. If the time tk1 has elapsed, the shift controller 20 outputs a control signal to reduce engine torque to the engine controller 25 in step S2040. Next, the shift controller 20 determines if the hold time ta1 (to maintain the duty Da2) exceeds a fourteenth predetermined value (e.g., 300 ms) in step S2050. If the hold time ta1 exceeds the fourteenth predetermined value in step S2050, the shift controller 20 adds a learned initial duty value to the duty Da2, and outputs a resulting duty Da3 to the element controller 30 in step S2060 (completion of region a).

The engine controller 25, according to the control signals output by the shift controller, outputs a control signal to the element controller 30 to reduce engine torque. As a result of the control signal received from the engine controller 25, the element controller 30 outputs control signals to the fuel injector and ignition timing system to control fuel injection amounts and ignition timing.

Next, the shift controller 20 determines if a hold time ta2 (of maintaining the duty Da3) is greater than or equal to a sixteenth predetermined value (roughly 500 ms) in step S2070, and, at the same time (during region b), performs a run-up prevention sub-routine in step S2071 and a tie-up prevention sub-routine in step S2072. The run-up prevention sub-routine prevents the increase in turbine rpm as a result of back pressure of the fourth friction element C4, while the tie-up prevention sub-routine prevents the reduction in turbine rpm as a result of back pressure of the fourth friction element C4. If the duty Da3 is maintained for a duration greater than or equal to the sixteenth predetermined value, the shift controller 20 adds a predetermined value Δd2 to the duty Da3 to generate an increased duty Da4, and outputs the duty Da4 to the element controller 30 in step S2080 (completion of region b).

Following the above step, the shift controller 20 increases the duty Da4 at a predetermined seventeenth value (a rate of α%/sec) and outputs the same to the element controller 30 in step S2090. The shift controller 20 then determines if region C completion conditions are satisfied in step S2100. Region C completion conditions include the satisfaction of (No×second speed ratio)−Nt≦an eighteenth predetermined value (XN: map value) for two or more cycles, and (No× second speed gear ratio−Nt)/dNt≦a nineteenth predetermined value (e.g., 50 ms) for two or more cycles. If region C completion conditions are satisfied in step S2100, the shift controller 20 outputs a duty Da5 in step S2110. The shift controller 20 then performs open-loop control over region (d) in step S2120, the open-loop control being provided in the pre-installed program of the shift controller 20.

However, if region C completion conditions are not satisfied in step S2100, the shift controller 20 determines if a set time tc of region C is greater than a twentieth predetermined value (e.g., 300 ms) in step S2105. If this condition is satisfied, the duty Da5 is output, even if region C completion conditions are not satisfied. That is, step S2110 is performed. However, if the set time tc of region C is not greater than the twentieth predetermined value, it is determined if region C completion conditions are satisfied. That is, step S2100 is performed.

Back in step S2070, if the hold time ta2 is greater than or equal to a sixteenth predetermined value, the shift controller 20 determines if the condition Nt−(No×second gear ratio) >10 rpm is met in step S2075. If this condition is satisfied, the duty Da4, which is the duty Da3+Δd3, is output by the shift controller 20 in step S2080. However, if the condition of step S2075 is not satisfied, the duty is set to a duty Da5 as shown in FIG. 9, and output in step S2110. Next, step S2120 of performing open-loop duty control of region d is performed.

Following the above, the shift controller 20 determines if open-loop duty control completion conditions are satisfied in step S2130. If the open-loop duty control completion conditions are met, the shift controller 20 outputs a control disengagement request signal to the engine controller 25 in step S2140, after which the shift controller 20 outputs a duty Da6 in step S2150. However, if the open-loop duty control completion conditions are not satisfied in step S2130, the shift controller 20 continues to perform step S2120.

Following the output of the duty Da6 in step S2150, the shift controller 20 determines if second speed synchronization is completed in step S2160. That is, the shift controller 20 checks if the following condition is met: turbine rpm Nt=Noxsecond speed gear ratio. If it is determined that second speed synchronization is completed, the shift controller 20 controls duty to 0%, then after duty control is finished in step S2170, an initial duty of region b and region C is learned in step S2180. Here, the initial duty is learned by adding a learned duty compensation value to a map value set in the pre-installed program. The learned initial duty of step S2180 is used as a subsequent initial duty compensation value.

However,. if second speed synchronization is not completed in step S2160, the shift controller 20 determines if an output time te of the duty Da6 is greater than or equal to a twenty-second predetermined value (e.g., 300 ms) in step S2165, the twenty-second predetermined value being provided by the pre-installed program of the shift controller 20. If the output time te of the duty Da6 is greater than or equal to the twenty-second predetermined value, the shift controller 20 performs step S2170 of controlling duty to 0%, regardless of whether second speed synchronization is completed. Accordingly, the second sub-routine is completed and the process is returned to the main routine.

Figure 6:
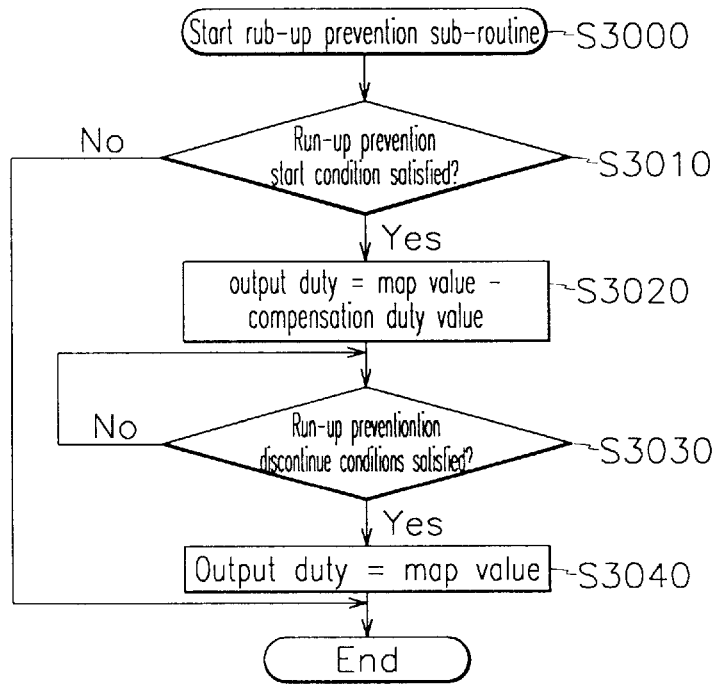
FIG. 6 is a flow chart of a run-up control sub-routine of the shift control method according to the preferred embodiment of the present invention.

With reference to FIG. 6, if the run-up prevention sub-routine is started in step S3000, the shift controller 20 first determines if a run-up prevention start condition is satisfied in step S3010. That is, the shift controller 20 determines if a change in turbine rpm dNt is greater than or equal to a twenty-third predetermined value (roughly 40 rpm). If the run-up prevention start condition is met in step S3010, the shift controller 20 subtracts a predetermined compensation duty from a map value (determined by the pre-installed program), and outputs a resulting duty in step S3020.

Next, the shift controller 20 determines if run-up prevention discontinue conditions are satisfied in step S3030. That is, it is determined if the conditions of Nt−Noxsecond gear ratio>a predetermined standard value, change in turbine rpm dNt<0, and Nt>No are satisfied, or if the single condition of the change in turbine rpm dNt<a predetermined standard value. If the run-up prevention discontinue conditions are satisfied, the shift controller 20 outputs an output duty equal to a map value, provided in the pre-installed program, in step S3040, thereby completing the run-up prevention control. The process is then returned to feedback duty control or open-loop duty control.

Figure 7:
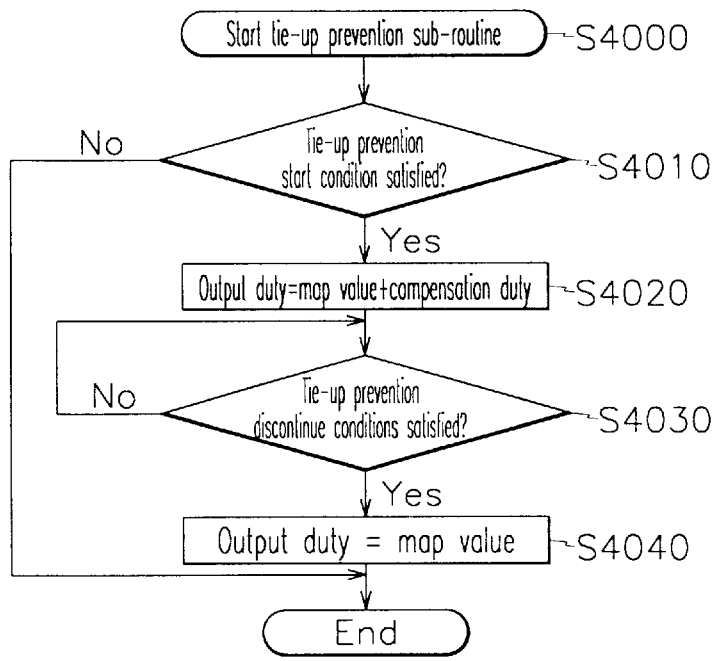
FIG. 7 is a flow chart of a tie-up control sub-routine of the shift control method according to the preferred embodiment of the present invention.

With reference to FIG. 7, if the tie-up prevention sub-routine is started in step S4000, the shift controller 20 determines if a tie-up prevention start condition is satisfied in step S4010. That is, the shift controller 20 determines if the condition of Noxsecond gear ratio−Nt>a predetermined twenty-fourth value (roughly 40 rpm). If this condition is met, it is determined that tie-up is occurring and the shift controller 20 adds a predetermined compensation duty from a map value (determined by the pre-installed program), and outputs a resulting duty in step S4020.

Next, the shift controller 20 determines if tie-up prevention discontinue conditions are satisfied in step S4030. That is, it is determined if the conditions of Noxsecond gear ratio−Nt>a predetermined standard value, and a change in turbine rpm dNt<predetermined value, or if the single condition of Noxsecond gear ratio−Nt≦a predetermined standard value. If the tie-up prevention discontinue conditions are satisfied, the shift controller 20 outputs an output duty equal to a map value, provided in the pre-installed program, in step S4040, thereby completing the tie-up prevention control. The process is then returned to feedback duty control or open-loop duty control.

In the shift control method of the present invention described above, when the accelerator pedal is depressed by the driver during LFU shifting into a third speed from a second speed, shifting is immediately performed back into the second speed after the completion of shifting into the third speed, and, at the same time, run-up and tie-up prevention is performed if needed, learn control is performed, and automatic transmission fluid temperature and throttle compensation are performed. As a result, acceleration performance is improved and shift shock is minimized.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for an automatic transmission comprising the steps of:
outputting a predetermined shift control signal while driving in a second speed for controlling shifting into a third speed if signals indicating that shifting from the second speed into the third speed are applied;
determining if third speed synchronization is completed;
performing driving in the third speed if third speed synchronization is completed, or determining if a tip-in signal has been applied if third speed synchronization is not completed;
outputting a throttle compensation duty and determining if signals corresponding to 3-2 kickdown shifting are received if a tip-in signal is applied during third speed synchronization;
comparing an oil temperature with a first predetermined value if signals corresponding to 3-2 kickdown shifting are received;
comparing a vehicle speed with a second predetermined value if the oil temperature is greater than or equal to the first predetermined value;
detecting an On/Off state of a kickdown switch if the vehicle speed is greater than or equal to the second predetermined value;
determining if a difference of turbine rpm and engine rpm is greater than or equal to a third predetermined value if the kickdown switch is in the On state;
performing 3-2 kickdown shift control during shifting from the second speed to the third speed if the difference of turbine rpm and engine rpm is greater than or equal to the third predetermined value; and
performing 3-2 kickdown shift control after third speed synchronization is completed if the difference of turbine rpm and engine rpm is smaller than the third predetermined value.

2. The method of claim 1 wherein the first predetermined value is 20° C.

3. The method of claim 1 wherein the second predetermined value is 1500 rpm.

4. The method of claim 1 wherein if the oil temperature is less than the first predetermined value, 3-2 kickdown shifting is performed after synchronization into the third speed is completed.

5. The method of claim 1 further comprising the steps of:
determining that the kickdown switch is On if the vehicle speed is less than the second predetermined value; and
performing 3-2 kickdown shift control after third speed synchronization is completed if the kickdown switch is On.

6. The method of claim 5 wherein if it is determined that the kickdown switch is Off, 3-2 kickdown shift control during shifting from the second speed to the third speed includes the steps of:

outputting an SCSV-B On signal;

outputting general control signals after a duty is compensated, and if an initial fill time is elapsed outputting predetermined duty control signals to perform run-up and tie-up control; and performing initial duty learn control if 3-2 kickdown shift duty control is completed.

7. The method of claim 6 wherein the duty compensation is realized by adding a predetermined compensation duty to a final duty value of a throttle compensation duty.

8. The method of claim 6 wherein the general control signals are output if a predetermined time has elapsed after the compensation duty is output.

9. The method of claim 6 wherein the initial fill time is 300 ms.

10. The method of claim 6 wherein the step of outputting the predetermined duty control signals includes the steps of:

performing open-loop duty control, that is, after compensating a duty Da3 by a predetermined first compensation duty following the holding of the duty for a predetermined hold time ta2, increasing a resulting duty by a rate of $\alpha\%$/sec, and after compensating the duty by a second predetermined compensation duty, performing open-loop duty control;

maintaining an output duty for a predetermined hold time te and determining if shift synchronization is completed following the completion of general control if open-loop duty control is completed; and completing duty control is shift synchronization is completed.

11. The method of claim 10 wherein the hold time ta2 is 500 ms.

12. The method of claim 10 wherein if the hold time ta2 is not elapsed, it is determined if the condition of Nt−(No× second gear ratio)>10 rpm; and if this condition is satisfied, increasing the duty by a rate of $\alpha\%$/sec after compensating the duty by the predetermined second compensation duty.

13. The method of claim 12 wherein if the condition of Nt−(No×second gear ratio)>10 rpm is not satisfied, a present duty value is compensated by a predetermined compensation value, and open-loop duty control is performed.

14. The method of claim 6 wherein the duty output completion conditions include the satisfaction of (No× second gear ratio)−Nt≦an eighth predetermined value for two or more cycles, or ≦a ninth predetermined value for two or more cycles.

15. The method of claim 14 wherein the eighth predetermined value is a predetermined map value of a pre-installed program.

16. The method of claim 14 wherein the ninth predetermined value is 50 ms.

17. The method of claim 6 wherein if the duty completion conditions are not satisfied, it is determined if tc has exceeded a tenth predetermined value; and if tc has exceeded the tenth predetermined value, duty is compensated by a map value in a pre-installed program, regardless of whether duty completion conditions are satisfied, then open-loop duty control is performed.

18. The method of claim 17 wherein the tenth predetermined value is 300 ms.

19. The method of claim 17 wherein if tc has not exceed the tenth predetermined value, duty is increased by a rate of $\alpha\%$/sec.

20. The method of claim 6 wherein 3-2 kickdown shift duty control completion is realized if it is determined that shift synchronization has occurred.

21. The method of claim 20 wherein shift synchronization is determined if turbine rpm have reached a target turbine rpm.

22. The method of claim 20 further comprising the steps of:

determining if te has exceeded an eleventh predetermined time if shift synchronization has not occurred;

completing shifting if te has exceeded the eleventh predetermined time, regardless of whether synchronization has occurred; and maintaining duty for te and continuously checking the completion of shift synchronization if te has not exceeded the eleventh predetermined time.

23. The method of claim 22 wherein te is 300 ms.

24. The method of claim 1 wherein the third predetermined value is a map value established in a pre-installed program.

25. The method of claim 1 wherein if it is determined that the kickdown switch if Off, a duty of 0% is output and duty control is completed.

26. The method of claim 1 wherein the step of performing 3-2 kickdown shift control during shifting from the second speed to the third speed if the difference of turbine rpm and engine rpm is greater than or equal to the third predetermined value comprises the steps of:

determining turbine rpm after outputting a SCSV-B On signal and compensating duty by using a final duty value as an initial value and outputting the same;

setting a duty hold time ta as a twelfth predetermined value if turbine rpm are high, setting the duty hold time ta as a thirteenth predetermined value if turbine rpm are at a medium level, and setting the duty hold time ta as a fourteenth predetermined value if turbine rpm are low;

outputting general control signals if tk1 has elapsed, and determining if turbine rpm have reached target turbine rpm;

setting and outputting an output duty as a map value established in a pre-installed program if turbine rpm have reached the target turbine rpm, and determining a state of the kickdown switch and performing run-up prevention control and tie-up prevention control;

compensating the present output duty by $\Delta d3$ if the kickdown switch is Off, then increasing duty by a rate of $\alpha\%$/sec;

determining if duty output completion conditions are satisfied;

compensating the duty by a compensation value established by the pre-installed program if the duty output completion conditions are satisfied, then performing feedback duty control;

determining if feedback duty control completion conditions are satisfied;

completing feedback duty control and completing general control if the feedback duty control completion conditions are satisfied, then maintaining output duty for a hold time te and determining if shift synchronization is completed; and completing duty control and performing initial duty learn control if shift synchronization is completed.

27. The method of claim 26 wherein the twelfth predetermined value is 10 ms, the thirteenth predetermined value is 50 ms, and the fourteenth predetermined value is 100 ms.

28. The method of claim 26 wherein if turbine rpm have not reached the target turbine rpm, it is determined if ta1>ta1+10 ms; the output duty is set as the map value even if turbine rpm have not reached the target turbine rpm if ta1>ta1+10 ms is satisfied; and it is determined if turbine rpm have reached the target turbine rpm if ta1>ta1+10 ms is not satisfied.

29. The method of claim 26 wherein if it is determined that the kickdown switch is On, it is determined if Nt−(No× second gear ratio)>10 rpm is satisfied; and if this condition is met, the present output duty is compensated by a predetermined value and a resulting duty is output.

30. The method of claim 29 wherein if the condition of Nt−(No×second gear ratio)>10 rpm is not satisfied, the duty is compensated by a predetermined value then feedback duty control is performed.

31. The method of claim 26, wherein the duty output completion conditions are (No×second speed ratio)−Nt≦a fifteenth predetermined value for two or more cycles, and (No×second speed gear ratio−Nt)/dNt≦a sixteenth predetermined value for two or more cycles.

32. The method of claim 31 wherein the fifteenth predetermined value is a map value established by the pre-installed program.

33. The method of claim 31 wherein the sixteenth predetermined value is 50 ms.

34. The method of claim 26 wherein if the duty output completion conditions are not satisfied, it is determined if tc has exceeded a seventeenth predetermined value; if tc has exceeded the seventeenth predetermined value, duty is compensated by a map value established in the pre-installed program and a resulting duty output; and open-loop duty control is performed.

35. The method of claim 34 wherein the seventeenth predetermined value is 300 ms.

36. The method of claim 34 wherein if tc has not exceeded the seventeenth predetermined value, duty is increased by a rate of α%/sec.

37. The method of claim 26 wherein the feedback duty control completion conditions include Nt−No×second gear ratio≦±XG for five or more cycles, or feedback control time $(t_{Fb})$≧an eighteenth predetermined value.

38. The method of claim 37 wherein XG is a map value established by the pre-installed program.

39. The method of claim 37 wherein the eighteenth predetermined value is 300 ms.

40. The method of claim 26 wherein it is determined that shift synchronization is completed when turbine rpm have reached target turbine rpm.

41. The method of claim 26 wherein if shift synchronization is not completed, it is determined if te has exceeded a nineteenth predetermined value; shifting is completed regardless of whether shift synchronization has taken place if te has surpassed the nineteenth predetermined value; and duty is maintained for te and shift synchronization completion is continuously detected if te has not surpassed the nineteenth predetermined value.

42. The method of claim 41 wherein the nineteenth predetermined value is 300 ms.

43. The method of claims 6 or 26 wherein run-up prevention control comprises the steps of:
   determining if a run-up prevention start condition is satisfied;
   compensating a present duty by a map value and outputting a resulting duty if the run-up prevention start condition is satisfied, and determining if run-up prevention discontinue conditions are satisfied; and
   outputting a duty as a map value established in the pre-installed program if the run-up prevention discontinue conditions are satisfied.

44. The method of claim 43 wherein the run-up prevention start condition includes determining if a change in turbine rpm is greater than or equal to a predetermined twentieth value.

45. The method of claim 44 wherein the predetermined twentieth value is 40 rpm.

46. The method of claim 43 wherein the run-up prevention discontinue conditions include determining if Nt−No× second gear ratio>a predetermined standard value, change in turbine rpm<0, and Nt>No are satisfied, or if the single condition of the change in turbine rpm<a predetermined standard value.

47. The method of claims 6 or 26 wherein tie-up prevention control comprises the steps of:
   determining if a tie-up prevention start condition is satisfied;
   compensating a present duty by a map value and outputting a resulting duty if the tie-up prevention start condition is satisfied, and determining if tie-up prevention discontinue conditions are satisfied; and
   outputting a duty as a map value established in the pre-installed program if the tie-up prevention discontinue conditions are satisfied.

48. The method of claim 47 wherein the tie-up prevention start condition includes determining if No×second gear ratio−Nt>a predetermined twenty-first value.

49. The method of claim 47 wherein the predetermined twenty-first value is 20 rpm.

50. The method of claim 47 wherein the tie-up prevention discontinue conditions include determining if No×second gear ratio−Nt>a predetermined standard value, and a change in turbine rpm dNt<predetermined value, or if the single condition of No×second gear ratio−Nt≦a predetermined standard value.

51. The method of claims 6 or 26 wherein the initial duty learn control is performed by learning a value derived by adding a duty compensation amount learned previously to a map value established by the pre-installed program.

* * * * *